US008454249B2

(12) United States Patent
Nishimura et al.

(10) Patent No.: US 8,454,249 B2
(45) Date of Patent: Jun. 4, 2013

(54) FOCAL PLANE SHUTTER FOR CAMERAS AND DIGITAL CAMERA PROVIDED WITH THE SAME

(75) Inventors: Kohei Nishimura, Tokyo (JP); Yuki Nakamura, Tokyo (JP); Yusuke Togo, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/404,357

(22) Filed: Feb. 24, 2012

(65) Prior Publication Data
US 2012/0219280 A1 Aug. 30, 2012

(30) Foreign Application Priority Data

Feb. 25, 2011 (JP) ................................. 2011-040032

(51) Int. Cl.
*G03B 9/08* (2006.01)
(52) U.S. Cl.
USPC ......................................................... 396/456
(58) Field of Classification Search
USPC ......................................................... 396/456
See application file for complete search history.

(56) References Cited

U.S. PATENT DOCUMENTS 8,348,526 B2 * 1/2013 Shintani ......................... 396/357
2004/0223756 A1 * 11/2004 Nakano et al. ................ 396/489
2010/0027987 A1 * 2/2010 Tanaka et al. ................. 396/465

FOREIGN PATENT DOCUMENTS

| JP | 2001-222059 | 8/2001 |
| JP | 2003-222928 | 8/2003 |
| JP | 2007-298544 | 11/2007 |

* cited by examiner

*Primary Examiner* — Clayton E Laballe
*Assistant Examiner* — Dennis Hancock
(74) *Attorney, Agent, or Firm* — Wenderoth, Lind & Ponack, L.L.P.

(57) ABSTRACT

A second blade-driving mechanism includes second blade-driving first member and second blade-driving second member, only the second blade-driving second member is rotated against elastic force of a blade-driving spring while the second blade-driving first member engages and is locked by a locking member at start of cocking operation of the cocking member to keep a second blade covering an exposure aperture, and the second blade-driving first member is disengaged from locking member at final stage of cocking operation, so the second blade-driving first member can be rotated by elastic force of a second blade-cocking spring and the second blade is made to open the exposure aperture. Staring cocking operation of a focal plane shutter is possible irrespective of the length of time during which imaging information can be transferred from an image sensor to storage via an information-processing circuit.

12 Claims, 10 Drawing Sheets

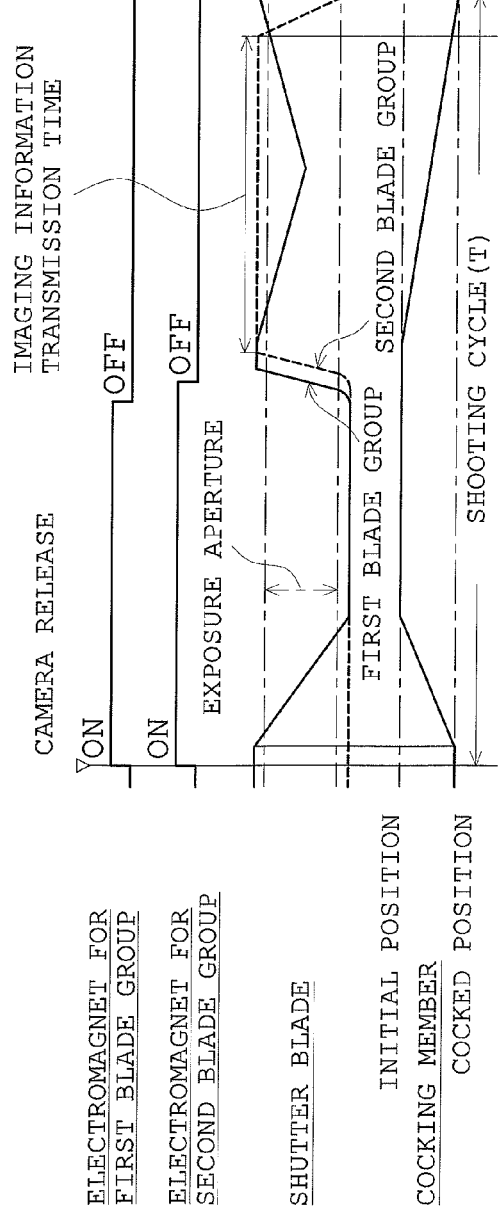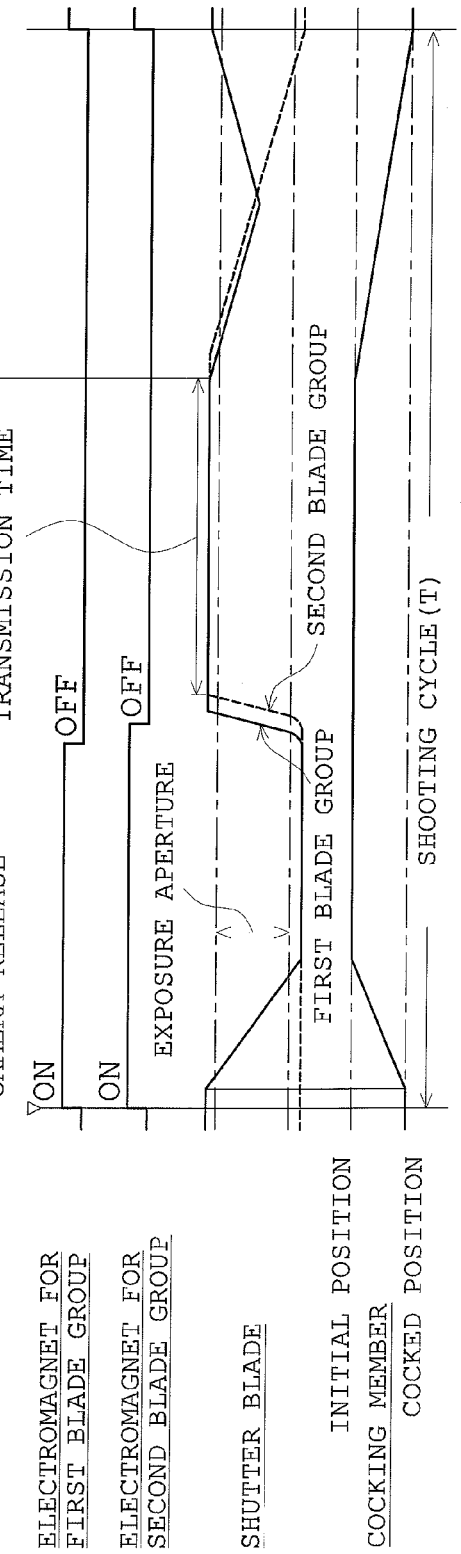

FOCAL PLANE SHUTTER FOR CAMERAS AND DIGITAL CAMERA PROVIDED WITH THE SAME

BACKGROUND OF THE INVENTION

1. Field of Invention

This invention relates to a focal plane shutter for cameras and to a digital camera provided with the same.

2. Description of the Related Art

Focal plane shutters for digital cameras include focal plane shutters each of which is provided with two kinds of shutter blades called a first blade and a second blade respectively. This type of focal plane shutter has had substantially the same structure as focal plane shutters for film-based cameras do, formerly. A first blade-driving mechanism for focal plane shutters of this type is composed of a first blade-driving member and a first blade-driving spring, and a second blade-driving mechanism for focal plane shutters of this type is comprised of a second blade-driving member and a second blade-driving spring. A first blade and a second blade are connected directly to the first blade-driving member and the second blade-driving member, respectively. In shooting, these two blade-driving members are rotated by the elastic forces of the first blade-driving and second blade-driving springs respectively, in turn. And, the first blade opens an exposure aperture and then the second blade closes the exposure aperture afterward, so that the light-receiving plane of an image sensor like CCD is exposed.

And, when the exposure operations of the first and second blades are complete, imaging information is transferred from the image sensor to a storage device through an information-processing circuit while the second blade is covering the exposure aperture. Afterward, the cocking operation of focal plane shutter of this type is immediately performed in such a way that a cocking member rotated from its initial position makes these two blade-driving members reverse up to their cocked positions against the elastic forces of the respective blade-driving springs. As a result, in a focal plane shutter of this type, the second blade leaves the exposure aperture and the first blade covers the exposure aperture in a state in which the cocking operation is complete, or a state in which the focal plane shutter of this type is on standby for shooting.

Also, mechanisms for preventing the two blade-driving members from rotating until an exposure operation is performed in next shooting include mechanisms called "locking type" and mechanisms called "direct type". In these two types of mechanism, the locking-type mechanisms are formed in such a way that blade-driving members are made to engage with locking members respectively to be locked in respective their cocked positions. As a result, the cocking member may be made to immediately return to its initial position when the cocking operation is complete, or the cocking member may be made to return to its initial position before the exposure aperture-opening operation of the first blade in releasing camera shutter. And, the respective locking members are operated by respective electromagnets and the respective blade-driving members are released from the respective engagements with the locking members in turn, so that the exposure operations of the first and second blades are performed.

On the other hand, the direct-type mechanisms are formed in such a way that: each of the two blade-driving members is provided with a iron piece member; and the cocking member rotates these blade-driving members, until these iron piece members come into contact with electromagnets not magnetized respectively as a result of the cocking operation. As a result, in the direct-type focal plane shutters, the cocking member does not return to its initial position even after the iron piece members come into contact with the electromagnets not magnetized respectively, so that the cocking member keeps the iron piece members coming into contact with the electromagnets not magnetized. And, when a release button of a camera is pressed in next shooting and each of the electromagnets are magnetized to attract and hold the iron piece members, the cocking member is made to return to its initial position. And, afterward, each of the electromagnets is demagnetized to release the respective iron piece members from the magnetic attractions due to the electromagnets in turn, so that the exposure operations of the first and second blades are performed.

As described above, this type of focal plane shutter is formed in such a way that the exposure aperture is closed by the first blade in a state in which this type of focal plane shutter is on standby for shooting, both in the case of locking-type focal plane shutters and in the case of direct-type focal plane shutters. Accordingly, digital cameras provided with this type of focal plane shutter are usually provided with optical finders, respectively.

Now, there has occurred the necessity that digital cameras provided with focal plane shutter should also include electronic view finders with a crystal liquid display device or the like respectively, as well as digital cameras provided with lens shutter, in recent years. Accordingly, while the number of cameras each of which is provided with only an optical finder as before has decreased, the number of cameras each of which is provided with both of an optical finder and an electronic view finder or provided with only an electronic view finder has increased. And, although there is a publically-known manner in which a camera is provided with an another image sensor for an electronic view finder other than an image sensor for shooting in the case where the camera is provided with the electronic view finder, it is usual to use a single image sensor both for displaying an image and for capturing an image.

However, in the case where a single image sensor is used both for displaying an image and for capturing an image, a focal plane shutter in such a case has to be formed in such a way that: not only a second blade, but also a first blade is made to leave an exposure aperture, in the cocked state of the focal plane shutter; and, when a release button is pressed in shooting, the first blade is operated to cover the exposure aperture at its initial stage, and the exposure aperture is opened by the first blade and by the second blade in turn at the next stage. That is to say, the focal plane shutter in such a case has to be formed in such a way that, in the cocking operation, while the second blade is made to operate from a state of the second blade closing the exposure aperture to a state of the second blade opening the exposure aperture, the first blade is made not to operate from a state of the first blade opening the exposure aperture to a state of the first blade closing the exposure aperture.

In order to achieve such operations of the first and second blades, a focal plane shutter is formed in such a way that: the first blade-driving mechanism is composed of two members which are a first blade-driving first member directly connected to the first blade and a first blade-driving second member directly biased by the first blade-driving spring; in the cocking operation, only the first blade-driving second member is moved to its cocked position so that the first blade keeps opening the exposure aperture to make it possible to observe an object with the electronic view finder; when a release button is pressed in shooting, the cocking member is returned from its cocked position to its initial position at its initial stage, the first blade-driving first member is rotated by the elastic force of a spring weaker than the first blade-driving spring in the process of the return of the cocking member to its initial position (where the spring weaker than the first blade-driving spring is called "first blade-cocking spring" below), so that first blade is moved to close the exposure aperture; and, at the next stage, the first blade-driving second member makes the first blade perform its exposure operation while the first blade-driving second member is being accompanied by the first blade-driving first member, and then the second blade-driving member subsequently makes the second blade perform its exposure operation. Japanese Patent TOKUKAI No. 2001-222059 discloses such a focal plane shutter.

However, the focal plane shutter disclosed in Japanese Patent TOKUKAI No. 2001-222059 is formed in such a way that, when a release button is pressed in shooting and then the cocking member returns to its initial position at the initial stage, the first blade-driving first member is moved just before the return of the cocking member to its initial position is complete, so that the first blade closes the exposure aperture. And, in this case, the first blade-driving first member is rotated from a state of the first blade completely opening the exposure aperture to a state of the first blade completely closing the exposure aperture by the elastic force of the first blade-cocking spring, in one sitting. Accordingly, if any countermeasures are not taken, the first blade bounces large when the operation of the first blade closing the exposure aperture is complete, so that the exposure operation is not allowed to start until the bounce of the first blade stops. Japanese Patent TOKUKAI No. 2003-222928 discloses a focal plane shutter formed in such a way that, when the cocking member returns from its cocked position to its initial position, the first blade-driving first member is moved at the initial stage of the operation of the cocking member returning to its initial position so that the first blade is made to start to close the exposure aperture early.

However, although Japanese Patent TOKUKAI No. 2003-222928 discloses a structure for making it possible to rotate the first blade-driving first member at the stage where the cocking member returns to its initial position when a release button is pressed in shooting, the structure for the focal plane shutter disclosed in Japanese Patent TOKUKAI No. 2003-222928 is not necessarily favorable for mass-producing focal plane shutters. Now, Japanese Patent TOKUKAI No. 2007-298544 discloses a focal plane shutter formed in such a way that: in the process of returning the cocking member to its initial position, the first blade-driving first member is indirectly made to follow the return operation of the cocking member from the beginning of the process so as to make the first blade close the exposure aperture; and the first blade-driving first member is made to stop following the return operation of the cocking member before the cocking member completely returns to its initial position, so that the bounce of the first blade is small and the first blade favorably is stopped when the cocking member stops in its initial position. The focal plane shutter disclosed in Japanese Patent TOKUKAI No. 2007-298544 has a structure extremely favorable also for mass-production.

The present invention relates to improvements in a focal plane shutter for cameras as disclosed in Japanese Patent TOKUKAI No. 2001-222059, Japanese Patent TOKUKAI No. 2003-222928, or Japanese Patent TOKUKAI No. 2007-298544 and in a digital camera provided with the same, the focal plane shutter for cameras being applicable for both the cases of locking type and of direct type and being formed in such a way that: a first blade-driving mechanism includes a first blade-driving first member connected to a first blade and rotated by the elastic force of a first blade-cocking spring until the first blade reaches to its exposure operation-starting position at the initial stage after releasing shutter, and a first blade-driving second member rotated by the elastic force of a first blade-driving spring in the exposure operation and rotating the first blade-driving first member against the elastic force of the first blade-cocking spring so as to make a first blade open an exposure aperture; a second blade-driving mechanism includes a second blade-driving member connected to a second blade and rotated by the elastic force of a second blade-driving spring in the exposure operation so as to make the second blade close the exposure aperture; and, while the first blade-driving second member and the second blade-driving member are made to move to their cocked positions against the driving forces for these blade-driving springs respectively when the cocking member moves from its initial position to its cocked position, the first blade-driving first member is moved to its exposure operation-starting position in the process of returning the cocking member to its initial position after releasing shutter.

SUMMARY OF THE INVENTION

Now, a digital camera provided with a conventional focal plane shutter as disclosed in Japanese Patent TOKUKAI No. 2001-222059, Japanese Patent TOKUKAI No. 2003-222928, or Japanese Patent TOKUKAI No. 2007-298544, is formed in such a way that: imaging information from an image sensor is transferred to a storage means when the second blade covers the exposure aperture after the exposure operation is complete; the cocking member is rotated after the transfer of the imaging information is complete, in order to perform the cocking operation of the focal plane shutter; and the second blade is made to perform its exposure aperture-opening operation to fully open the exposure aperture. And, the reason why the cocking operation is started after the transfer of the imaging information from the image sensor to the storage means is complete is that, if the cocking operation is started immediately after the exposure operation is complete, light entering through the exposure aperture during the transfer of the imaging information meets the image sensor and the imaging information is inevitably spoiled, as well known.

Also, this type of focal plane shutter is formed in such a way that: the cocking operation of the focal plane shutter is performed by rotating the cocking member by a camera body-side member; and, at this point, the cocking member makes the first blade-driving second member and the second blade-driving member rotate from their exposure operation-completion positions to their cocked positions against the strong elastic forces of the first blade-driving and second blade-driving springs respectively. As a result, such a cocking operation requires time which is overwhelmingly longer than time necessary for the exposure operation.

Accordingly, in conventional focal plane shutters having this type of structure, time which it takes to acquire a standby state of the focal plane shutter for next shooting (a cocking operation-completion state) from the time the exposure operation is complete cannot be merely determined by taking only time necessary for the cocking operation into consideration, and time which it takes to acquire a standby state of the focal plane shutter for next shooting from the time the exposure operation is complete is forced to become all the more long for the necessity to secure time necessary for the transfer of the imaging information to the storage means. Accordingly, such a structure is not necessarily favorable for the case where a user wants to capture another image immediately after capturing an image or for the case where shooting is performed with a continuous-shooting mode.

The present invention is made in order to solve such problems. The objective of the present invention is to offer: a focal plane shutter for cameras which is the kind of focal plane shutter disclosed in Japanese Patent TOKUKAI No. 2001-222059, Japanese Patent TOKUKAI No. 2003-222928, or Japanese Patent TOKUKAI No. 2007-298544, which makes it possible to determine the length of time from the completion of an exposure operation to next shooting while time necessary for transferring imaging information is being hardly taken into consideration, and which is applicable to both locking type structure and direct type structure; and a digital camera provided with the same.

In order to achieve the above-described objective, a focal plane shutter for cameras according to the present invention is formed in such a way that the focal plane shutter includes: a first blade-driving means which makes a first blade leave an exposure aperture by putting a cocking member in its cocked position under the cocked state of the focal plane shutter, as well as in a state of the focal plane shutter in the completion of the exposure operation, and which makes the first blade cover the exposure aperture in the return operation of the cocking member; a second blade-driving first member which is locked by a locking member so as to keep a second blade covering the exposure aperture during the cocking operation of the cocking member and makes the second blade leave the exposure aperture when the second blade-driving first member is released from the engagement with the locking member just before the cocking member reaches its cocked position; and a second blade-driving second member which is rotated by the cocking operation of the cocking member in a rotation direction bringing the second blade-driving second member to its cocked state and which rotates the second blade-driving first member in the exposure operation in a rotation direction in which the exposure operation of the second blade-driving first member is performed, so as to make the second blade cover the exposure aperture.

In this case, it is preferred that the first blade-driving means includes: a first blade-driving first member biased by a first blade-driving spring in a rotation direction in which the exposure operation of the first blade-driving first member is performed; and a first blade-driving second member connected to the first blade and biased by a coking spring in the rotation direction opposite to the rotation direction in which the exposure operation of the first blade-driving second member is performed. In addition, the focal plane shutter is formed in such a way that: the cocking member includes a pushing part; the locking member includes a part to be pushed; and the pushing part of the cocking member pushes the part to be pushed of the locking member just before the completion of the cocking operation of the cocking member so that the second blade-driving first member is released from the engagement with the locking member. As a result, a structure for operating the focal plane shutter in response to the movement of a camera body-side member does not have to be taken into consideration, and it is possible to achieve a shutter unit having an extremely favorable structure.

Also, in a focal plane shutter for cameras according to the present invention, it is preferred that: the locking member is given force rotating the locking member in one direction by a spring in order to engage with and lock the second blade-driving first member; and the second blade-driving first member meets the locking member just before the completion of the exposure operation and the locking member is rotated against the elastic force of the spring, with the result that the locking member also plays a role as a brake member for braking the rotation of the second blade-driving first member. In addition, in a focal plane shutter for cameras according to the present invention, it is preferred that the locking member also plays a role as a member for locking bouncing of the second blade-driving first member when the second blade-driving first member meets the stopper in the completion of the exposure operation. When the focal plane shutter is formed in such manners, the focal plane shutter does not have to be provided with an exclusive braking member to the second blade-driving first member or an exclusive member to the second blade-driving first member which prevents the second blade-driving first member from bouncing.

In addition, a digital camera according to the present invention which is provided with one of the above-described focal plane shutters makes it possible to perform next shooting early and to perform favorable continuous shooting.

According to the present invention, in a focal plane shutter for cameras which is provided with first and second blades and in which: an object image can be observed through an electronic view finder before performing shooting; and exposure of an image sensor starts when the first blade starts to open the exposure aperture after closing the exposure aperture once in performing shooting and the exposure of the image sensor is complete when the second blade completely closes the exposure aperture, and in a digital camera provided with the same, the second blade-driving mechanism is formed in such a way that: the second blade-driving mechanism is composed of the second blade-driving first member which makes the second blade open the exposure aperture when the second blade-driving first member is rotated by the elastic force of the second blade-cocking spring, and the second blade-driving second member which rotates the second blade-driving first member against the elastic force of the second blade-cocking spring when the second blade-driving second member is rotated by the elastic force of the second blade-driving spring, so as to make the second blade close the exposure aperture; at the start of the cocking operation, while the locking member engages with the second blade-driving first member to prevent the rotation of the second blade-driving first member, only the second blade-driving second member is rotated against the elastic force of the driving spring; and the second blade-driving first member is released from the engagement with the locking member at the final stage of the cocking operation, so that the second blade-driving first member can be rotated by the elastic force of the second blade-cocking spring. As a result, it is possible to start the cocking operation without taking time necessary for transferring imaging information from an image sensor to a storage device into consideration, so that next shooting can be performed earlier in focal plane shutters according to the present invention than in conventional focal plane shutters. Accordingly, focal plane shutters according to the present invention have the advantage of not missing a perfect moment for a good shot as compared with conventional focal plane shutters. Also, because of the advantage, focal plane shutters according to the present invention have the advantage of being capable of taking pictures at a higher frame rate in the case of continuous shooting.

BRIEF DESCRIPTION OF THE DRAWINGS

FIG. 10 is a timing chart shown so that the operation of the focal plane shutter of the present embodiment can be compared with the operation of a focal plane shutter of a conventional example, FIG. 10A corresponds to the case of the present embodiment, and FIG. 10B corresponds to the case of the conventional example.

DETAILED DESCRIPTION OF THE PREFERRED EMBODIMENTS

Figure 1:
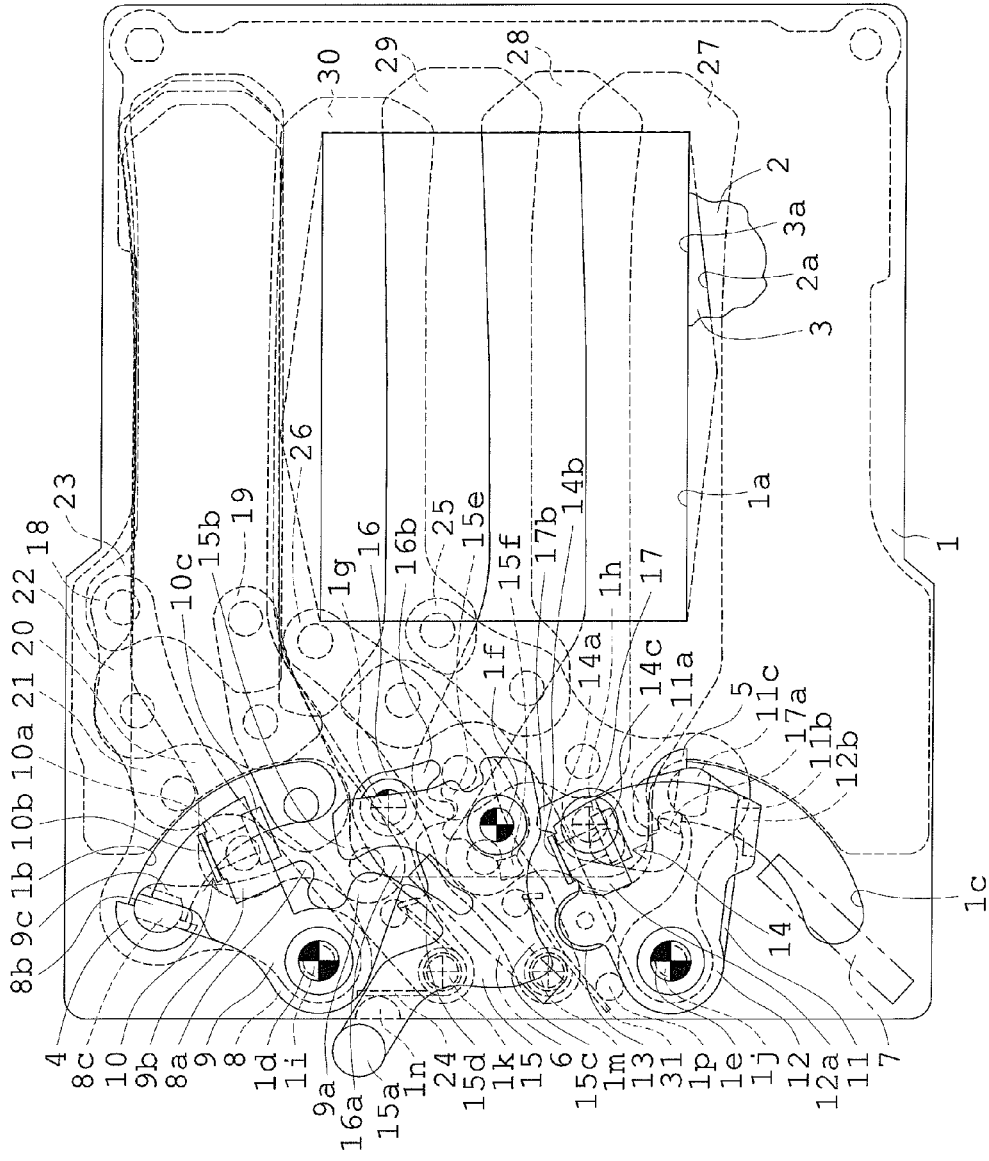
FIG. 1 is a plane view showing the state of a focal plane shutter of an embodiment of the present invention just after the completion of the exposure operation of the focal plane shutter.

The embodiment of the present invention shown in the drawings is explained, below. The focal plane shutter of the present embodiment is formed in such a way that the present invention is applied to the structure of the direct-type focal plane shutter disclosed in Japanese Patent TOKUKAI No. 2007-298544. However, as explained already, the present invention can be also applied to direct-type focal plane shutters having structures which are similar to the structures of the focal plane shutters disclosed in Japanese Patent TOKUKAI No. 2001-222059 and Japanese Patent TOKUKAI No. 2003-222928 respectively. In addition, the present invention can be also applied to locking-type focal plane shutters having structures which are similar to the structures of the focal plane shutters disclosed in Japanese Patent TOKUKAI No. 2001-222059, Japanese Patent TOKUKAI No. 2003-222928, and Japanese Patent TOKUKAI No. 2007-298544 respectively. And, those skilled in the art can easily understand it through below-described explanations.

Embodiment

Figure 2:
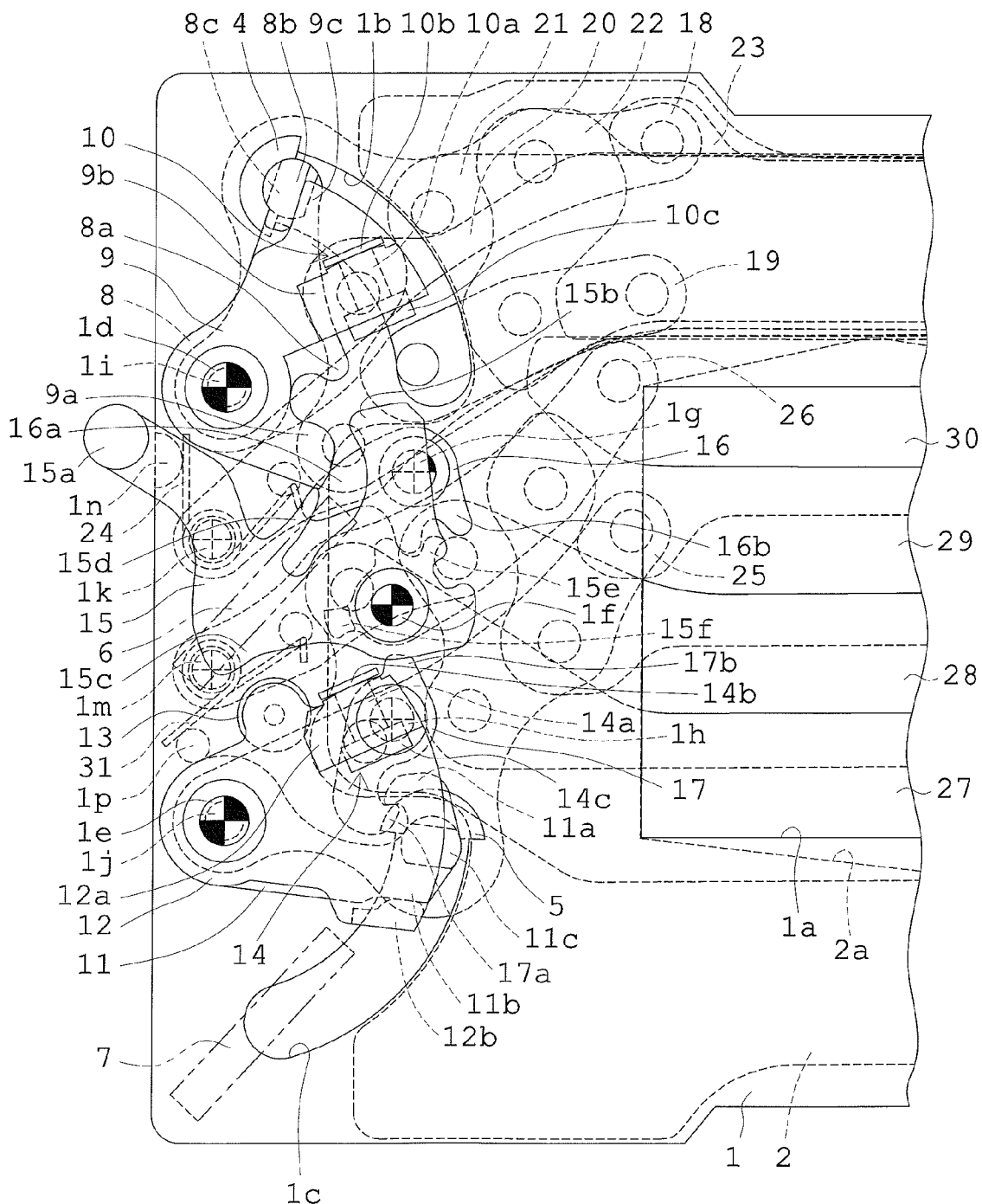
FIG. 2 is a plane view showing the approximately left-side half part of the focal plane shutter shown in FIG. 1 while the approximately left-side half part is being enlarged.

First, the constitution of the focal plane shutter of the present embodiment is explained mainly using FIGS. 1 and 2. FIG. 1 is a plane view showing a state of the focal plane shutter of the embodiment just after the completion of the exposure operation of the focal plane shutter. FIG. 2 is a plane view showing the approximately left-side half part of the focal plane shutter shown in FIG. 1 while the approximately left-side half part is being enlarged. Besides, the present embodiment is explained while it is being supposed that, when the focal plane shutter of the present embodiment is incorporated into a camera, the face side of FIG. 1 (this side) corresponds to the object side (the imaging-lens side) and the other side of FIG. 1 corresponds to the image-sensor side. However, as well known in the cases of digital cameras, the image-sensor side may be fixed at the face side of FIG. 1, and the object side may be fixed at the other side of FIG. 1.

In FIG. 1, a shutter base plate 1 is provided with a rectangle-shaped exposure aperture 1a which is located on the approximately middle portion of the shutter base plate 1. Also, as well known, a middle plate 2 and an auxiliary base plate 3 are fitted on the back side of the shutter base plate 1 in turn while the middle plate 2 is at a predetermined distance from the auxiliary base plate 3. A blade room for a first blade is formed between the shutter base plate 1 and the middle plate 2, and a blade room for a second blade is formed between the middle plate 2 and the auxiliary base plate 3. And, the middle plate 2 and the auxiliary base plate 3 are also provided with apertures 2a and 3a respectively, the apertures 2a and 3a being similar to the aperture 1a but being somewhat different from the aperture 1a in shape and size. And, the shape of the exposure aperture as a shutter unit through which light from an object passes may be formed by two or more apertures of the apertures 1a, 2a, and 3a. However, the shape of the exposure aperture is determined by only the shape of the aperture 1a in the present embodiment.

Besides, the shutter base plate 1 in the present embodiment is made of synthetic resin. Also, in order to make it possible to see parts of the middle plate 2 and the auxiliary base plate 3, some area of the shutter base plate 1 which is adjacent to the aperture 1a is omitted in FIG. 1. In addition, while the external shape of the middle plate 2 is drawn with broken line in FIGS. 1 and 2, the external shape of the auxiliary base plate 3 is not illustrated in FIGS. 1 and 2 because the auxiliary base plate 3 has approximately the same external shape as the shutter base plate 1 does. The external shape of the auxiliary base plate 3 is not illustrated also in FIGS. 3 to 9.

Two arc-shaped slots 1b and 1c are formed on a portion of the shutter base plate 1 on the left side of the aperture 1a. Well-known buffer members 4 and 5 the plane shapes of which are approximately shaped like the letter "C" and which are made of rubber are fitted to the upper edges of the slots 1b and 1c, respectively. Also, the middle plate 2 has a shape by which the middle plate 2 does not overlap with an area of the shutter base plate 1 on which the slots 1b and 1c are formed. The auxiliary base plate 3 is a thin plate. And, because the auxiliary base plate 3 overlaps with the area of the shutter base plate 1 on which the slots 1b and 1c are formed, the auxiliary base plate 3 is practically provided with slots not shown in the drawings, the slots on the auxiliary base plate 3 having approximately the same shape as the slots 1b and 1c do and being formed on the portions of the auxiliary base plate 3 which overlaps with the slots 1b and 1c respectively.

The shutter base plate 1 is provided with shafts 1d, 1e, 1f, 1g, and 1h which erect on the face side of the shutter base plate 1, or on the object-side of the shutter base plate 1. The shafts 1g and 1h are shorter than the other shafts 1d, 1e, and 1f. Also, the shutter base plate 1 is provided with shafts 1i, 1j, 1k, and 1m which erect on the back side of the shutter base plate 1, or on the image-sensor side of the shutter base plate 1. The shafts 1i and 1j are concentric with the shafts 1d and 1e, respectively. In addition, the shutter base plate 1 is provided with a semicircle-shaped spring-connection part 1n and a circle-shaped spring-connection part 1p which are placed on the back side of the focal plane shutter 1.

Not only these shafts, but also a plurality of pillars are erectly provided on the face side of the shutter base plate 1 practically, and a supporting plate and a print board as disclosed also in Japanese Patent TOKUKAI No. 2007-298544 are fixed to the top ends of a plurality of the pillars while the supporting plate is being placed nearer to the shutter base plate 1 than the print board. And, electromagnets for the first blade and for the second blade are fitted on the supporting plate while the electromagnets are being placed on the shutter-base-plate-1 side of the supporting plate, each of the electromagnets consisting of: a iron piece member which is approximately shaped like the letter "U" and the top ends of the two leg parts of which play a role as magnetic pole; and a bobbin around which a coil is wound and fitted to one of the leg parts of the iron piece member. However, because the constitution of these electromagnets and the constitution for fitting these electromagnets on the supporting plate are well known and the illustration of the whole structures of these electromagnets makes it difficult to illustrate the other components, only the iron piece members 6 and 7 of the electromagnets are illustrated with a long dashed double-short dashed line in FIGS. 1 and 2, as well as FIGS. 3 to 9.

A first blade-driving first member 8 and a first blade-driving second member 9, which constitute the first blade-driving mechanism and are made of synthetic resin, are fitted to the shaft 1d erectly provided on the face side of the shutter base plate 1, in such a way that: the first blade-driving first member 8 is placed nearer to the shutter base plate 1 than the first blade-driving second member 9; and the first blade-driving first and second members 8 and 9 can be rotated around the shaft 1d separately from each other. Besides, the shape of the first blade-driving first member 8 of them is shown more intelligibly in FIG. 4 than in FIGS. 1 and 2.

First, the first blade-driving first member 8 includes a part 8a to be checked, a part 8b to be pushed, and a driving pin 8c. The part 8b and the driving pin 8c are provided on the face side and back side of the first blade-driving first member 8, respectively, while the part 8b is being aligned with the driving pin 8c. The driving pin 8c which is provided on the back side of the first blade-driving first member 8 is inserted into the slot 1b of the shutter base plate 1. And, the sectional plane on the root side of the driving pin 8c is shaped like the letter, "D", and the arc-shaped surface on the root side of the driving pin 8c meets the buffer member 4. In addition, the sectional plane on the top-end side of the driving pin 8c has an oval shape, and, as described below, the top end part of the driving pin 8c is connected to the first blade in the blade room. The extreme portion of the top end of the driving pin 8c is inserted into the slot which is provided for the auxiliary base plate 3, and which has approximately the same shape as the slot 1b does, and which is not shown in the drawings.

On the other hand, the first blade-driving second member 9 includes a part 9a to be pushed, a fitting part 9b the object-side portion of which is thicker than the other side portion of the fitting part 9b, and a part 9c to be pushed. As well known, the first blade-driving second member 9 is biased by a first blade-driving spring not shown in the drawings so that the first blade-driving second member 9 is rotated in the counterclockwise direction by the elastic force of the first blade-driving spring. As well known, an iron piece member 10 and a compression spring not shown in the drawings are placed inside the fitting part 9b. The part 9c is a part for pushing the part 8b which is provided for the first blade-driving first member 8 when the first blade-driving second member 9 is rotated in the counterclockwise direction.

Also, the iron piece member 10 includes a disk-shaped head part 10b which is placed in one end of a shaft part 10a of the iron piece member 10, and an iron piece part 10c is fitted to the other end of the shaft part 10a. And, the iron piece member 10 is biased by the compression spring fitted to the shaft part 10a in the fitting part 9b so that the iron piece part 10c is made to protrude from the inside of the fitting part 9b. On the other hand, the focal plane shutter keeps states of the focal plane shutter shown in FIGS. 1 and 2 by the contact between the head part 10b and the edge of the fitting part 9b.

A second blade-driving first member 11 and a second blade-driving second member 12, which constitute the second blade-driving mechanism and are made of synthetic resin, are fitted to the shaft 1e erectly provided on the face side of the shutter base plate 1, in such a way that: the second blade-driving first member 11 is placed nearer to the shutter base plate 1 than the second blade-driving second member 12; and the second blade-driving first and second members 11 and 12 can be rotated around the shaft 1e separately from each other.

The second blade-driving first member 11 includes a part 11a to be locked, a part 11b to be pushed, and a driving pin 11c. The driving pin 11c which is provided on the back side of the second blade-driving first member 11 is inserted into the slot 1c of the shutter base plate 1. And, the sectional plane on the root side of the driving pin 11c is shaped like the letter, "D", and the arc-shaped surface on the root side of the driving pin 11c meets the buffer member 5. In addition, the sectional plane on the top-end side of the driving pin 11c has an oval shape, and, as described below, the top end part of the driving pin 11c is connected to the second blade in the blade room. The extreme portion of the top end of the driving pin 11c is inserted into the slot which is provided for the auxiliary base plate 3, which has approximately the same shape as the slot 1c does, and which is not shown in the drawings.

On the other hand, the second blade-driving second member 12 includes: a fitting part 12a the object-side portion of which is thicker than the other side portion of the fitting part 12a; and a pushing part 12b which is formed on the shutter-base-plate-1 side of the second blade-driving second member 12. And, a roller 13 as a part to be pushed is fitted to the shutter base plate 1-side face of the second blade-driving second member 12. And, as well known, the second blade-driving second member 12 is biased by a second blade-driving spring not shown in the drawings so that the second blade-driving second member 12 is rotated in the counterclockwise direction by the elastic force of the second blade-driving spring. The pushing part 12b is a part for pushing the part 11b which is provided for the second blade-driving first member 11 when the second blade-driving second member 12 is rotated in the counterclockwise direction.

An iron piece member 14 and a compression spring not shown in drawings are placed also inside the fitting part 12a of the second blade-driving second member 12. And, the iron piece member 14 includes a disk-shaped head part 14b which is placed in one end of a shaft part 14a of the iron piece member 14, and an iron piece part 14c is fitted to the other end of the shaft part 14a. Also, the iron piece member 14 is biased by the compression spring fitted to the shaft part 14a in the fitting part 12a so that the iron piece part 14c is made to protrude from the inside of the fitting part 12a. On the other hand, the focal plane shutter keeps states of the focal plane shutter shown in FIGS. 1 and 2 by the contact between the head part 14b and the edge of the fitting part 12a.

A cocking member 15, which is made of synthetic resin, is rotatably fitted to the shaft 1f erectly provided on the face side of the shutter base plate 1. The cocking member 15 includes: a part 15a which is pushed by a camera body-side member not shown in the drawings; a pushing part 15b which pushes the part 9a of the first blade-driving second member 9; a pushing part 15c which pushes the roller 13 fitted to the second blade-driving second member 12; and a braking part 15d which is flexible and is pushed by the part 9a of the first blade-driving second member 9 to be bent. In addition, the cocking member 15 further includes a thick part which is placed on the shutter base plate 1-side face of the cocking member 15 and by which the shaft 1f is surrounded. The thick part of the cocking member 15 is provided with a gear-shaped transmission part 15e and a pushing part 15f.

And, the cocking member 15 is biased by a return spring not shown in the drawings so that the cocking member 15 is rotated in the clockwise direction. On the other hand, FIGS. 1 and 2 show a state of the focal plane shutter in which a pin provided on the shutter base plate 1-side face of the cocking member 15 and not shown in the drawings meets a stopper provided on the shutter base plate 1 and not shown in the drawings, with the result that the clockwise rotation of the cocking member 15 due to the elastic force of such a return spring is stopped. Hereafter, this position of the cocking member 15 in this state is called as "initial position".

Besides, although the cocking member 15 in the present embodiment is made of only synthetic resin, it is not easy to make parts having such a shape with one kind material of synthetic resin in terms of mass-production. For example, although the part 15a is repeatedly and strongly pushed by the camera body-side member, the part 15a is provided on the top end of a slender arm-shaped portion of the cocking member 15. Accordingly, the arm-shaped portion of the cocking member 15 has to be made to have endurable strength. Also, sophisticated techniques for molding process are needed in order to make only the braking part 15d have flexibility without making the other portions of the coking member 15 have flexibility. Accordingly, in the case where parts like the cocking member 15 for the present embodiment are actually mass-produced, the optimum manner for making the cocking member 15 is such that: only the arm-shaped portion including the part 15a is made of metal; only the braking part 15d is made of soft synthetic resin; and the three portions of the arm-shaped portion, the braking part 15d, and the other portion of the cocking member 15 are integrated with one another to be made to constitute a single part.

A checking member 16, which is made of synthetic resin, is rotatably fitted to the shaft 1g erectly provided on the face side of the shutter base plate 1. The checking member 16 includes: a checking part 16a (which is shown more intelligibly in FIG. 4 than in FIGS. 1 and 2); and a gear-shaped transmission-receiving part 16b. And, the checking part 16a is located in the trajectory of the operation of the checked part 8a of the first blade-driving first member 8 when the cocking member 15 is not in its initial position or in positions close to the initial position of the cocking member 15. Also, the transmission-receiving part 16b engages with the transmission part 15e of the cocking member 15, so that the checking member 16 moves in response to the operation of the cocking member 15 and rotates in the direction opposite to the rotation of the cocking member 15. Besides, although the checking member 16 moves in response to the operation of the cocking member 15 in such a manner in the present embodiment, a structure for making the checking member 16 move in response to the operation of the cocking member 15 may be formed, for example, in the manner which is disclosed in Japanese Patent TOKUKAI No. 2007-298544, in the present embodiment.

A locking member 17, which is made of synthetic resin, is rotatably fitted to the shaft 1h erectly provided on the face side of the shutter base plate 1. The locking member 17 includes: an engagement part 17a which engages with the part 11a of the second blade-driving first member 11, with the result that the clockwise rotation of the second blade-driving first member 11 is prevented; and a part 17b which is pushed by the pushing part 15f of the cocking member 15. And, the locking member 17 is biased by a spring not shown in the drawings in such a way that the locking member 17 is rotated in the counterclockwise direction by the spring. On the other hand, FIGS. 1 and 2 show a state of the focal plane shutter in which the counterclockwise rotation of the locking member 17 is stopped by a stopper, the stopper being provided for the shutter base plate 1 and being not shown in the drawings.

Next, the structures on the back side of the shutter base plate 1 are explained. First, a first blade which is placed between the shutter base plate 1 and the middle plate 2 is composed of: an arm 18 one end of which is pivotally fitted to the shaft 1i of the shutter base plate 1; an arm 19 one end of which is pivotally fitted to the shaft 1k of the shutter base plate 1; and four blades 20, 21, 22, and 23 which are pivotally supported by the arms 16 and 19 toward the free ends of the arms 16 and 19 in turn, or toward the other ends of the arms 16 and 19 in turn. The blade 23 becomes a slit-forming blade for the first blade. Also, as well known, the top end of the driving pin 8c of the first blade-driving first member 8 is fitted into an elongate hole formed in the arm 18, the elongate hole being not shown in the drawings.

Also, a first blade-cocking spring 24 which is a helical torsion coil spring is fitted to the shaft 1k of the shutter base plate 1. And, one end of which the first blade-cocking spring 24 is connected to the spring-connection part 1n provided for the shutter base plate 1, and the other end of the first blade-cocking spring 24 is connected to a hole of the arm 19 (which has no reference numeral), with the result that the arm 19 is biased by the first blade-cocking spring 24 in such a way that the arm 19 is rotated in the clockwise direction. As a result, the first blade-driving first member 8 is biased indirectly by the first blade-cocking spring 24 in such a way that the first blade-driving first member 8 is rotated in the clockwise direction through the first blade. And, the elastic force of the first blade-cocking spring 24 is weaker than that of the first blade-driving spring by which the first blade-driving second member 9 is biased to be rotated in the counterclockwise direction.

Except for the manner of providing the first blade-cocking spring 24 as in the present embodiment, publically known manners of providing cocking springs include: a manner in which one end of a cocking spring is connected to the shutter base plate 1 and the other end of the cocking spring is connected to the first blade-driving first member 8, on the face side of the shutter base plate 1; and a manner in which one end of a cocking spring is connected to the first blade-driving second member 9 and the other end of the cocking spring is connected to the first blade-driving first member 8, on the face side of the shutter base plate 1. Accordingly, the present invention also allows such manners except the manner of providing cocking springs as in the present embodiment. However, the manner of providing the first blade-cocking spring 24 as in the present embodiment makes it possible to use the first blade-cocking spring 24 also as a well known looseness-removing spring for the first blade (or as a spring which is connected to the arm 19 so that the looseness between the components constituting the first blade is gotten rid of and the position of the slit-forming blade for the first blade in the exposure operation-starting position is invariable). Accordingly, the manner of providing the first blade-cocking spring 24 in the present embodiment is advantageous.

On the other hand, the second blade which is placed between the middle plate 2 and the auxiliary base plate 3 is composed of: an arm 25 which is pivotally fitted to the shaft 1j of the shutter base plate 1; an arm 26 which is pivotally fitted to the shaft 1m of the shutter base plate 1; and four blades 27, 28, 29, and 30 which are pivotally supported by the arms 25 and 26 toward the free ends of the arms 25 and 26 in turn. The blade 30 becomes a slit-forming blade for the second blade. Also, as known publically, the top end of the driving pin 11c of the second blade-driving first member 11 is fitted into an elongate hole formed in the arm 25, the elongate hole being not shown in the drawings.

Also, a second blade-cocking spring 31 which is a helical torsion coil spring is fitted to the shaft 1m of the shutter base plate 1. And, one end of which the second blade-cocking spring 31 is connected to the spring-connection part 1p provided for the shutter base plate 1, and the other end of the second blade-cocking spring 31 is connected to a hole of the arm 26 (which has no reference numeral), with the result that the arm 26 is biased by the second blade-cocking spring 31 in such a way that the arm 26 is rotated in the clockwise direction. As a result, the second blade-driving first member 11 is biased indirectly by the second blade-cocking spring 31 in such a way that the second blade-driving first member 11 is rotated in the clockwise direction through the second blade. And, the elastic force of the second blade-cocking spring 31 is weaker than that of the second blade-driving spring which is connected to the second blade-driving second member 12 and which is not shown in the drawings. And, the second blade-cocking spring 31 is also used as a well known looseness-removing spring for the second blade (or as a spring which is connected to the arm 26 so that the position of the slit-forming blade for the second blade in the exposure operation-starting position is invariable). However, the second blade-cocking member 31 may be connected directly to the second blade-driving first member 11.

Next, the operation of the focal plane shutter of the present embodiment is explained using FIG. 2 which is used in the above explanation of the constitution of the focal plane shutter, and FIGS. 3 to 10. Besides, FIGS. 3 to 10 show the approximately left side part of the focal plane shutter of the present embodiment shown in FIG. 1 while the approximately left side part is being enlarged, as well as FIG. 2. The four arms 18, 19, 25, and 26, and the blade-pivotally supporting parts of these arms are omitted in FIGS. 7 to 9 in order to make it easy to see these drawings. Also, in order to make it possible to understand the difference between the present embodiment and the conventional example, FIG. 10 is a chart in which the length of time from the time a release button of a camera is pressed to the time the focal plane shutter reaches a state of the focal plane shutter being on standby for next shooting is regarded as one cycle and which intelligibly shows the timing of each of the operations of the main component members for the present embodiment, FIG. 10A corresponds to the case of the present embodiment, and FIG. 10B corresponds to the case of the conventional example.

FIG. 2 shows a state of the focal plane shutter just after the exposure operation of the focal plane shutter is complete, as explained already. At this point, the first blade-driving second member 9 is biased by the well-known first blade-driving spring which is not shown in the drawings, in such a way that the first blade-driving second member 9 is rotated in the counterclockwise direction. And, the pressing part 9c of the first blade-driving second member 9 presses the part 8b of the first blade-driving first member 8 against the elastic force of the first blade-cocking spring 24, so that the driving pin 8c of the first blade-driving first member 8 is made to come into contact with the buffer member 4. As a result, this state of the first blade-driving first member 8 stopping is maintained. And, at this point, the four blades 20 to 23 for the first blade are stored in the upper area of the opening 1a with the four blades 20 to 23 overlapping with one another.

On the other hand, the second blade-driving second blade 12 is biased by the well known second blade-driving spring which is not shown in the drawings, in such a way that the pushing part 12b of the second blade-driving second member 12 pushes the part 11b of the second blade-driving first member 11 against the elastic force of the second blade-cocking spring 31 so that the second blade-driving first member 11 is rotated in the counterclockwise direction. However, because the driving pin 11c of the second blade-driving first member 11 comes into contact with the buffer member 5, this state of the second blade-driving first member 11 stopping is maintained. And, at this point, the four blades 27 to 30 for the second blade are unfolded and cover the opening 1a. Also, the stopper, which is provided for the shutter base plate 1 and not shown in the drawings, prevents the locking member 17 from being rotated in the counterclockwise direction by the elastic force of the spring which is not shown in the drawings. And, when the second blade-driving first member 11 is rotated in the clockwise direction, the part 11a engages with and is locked by the engagement part 17a, so that the clockwise rotation of the second blade-first member 11 is prevented.

Also, at this point, the cocking member 15 is in its initial position, and the gear-shaped transmission part 15e presses the gear-shaped transmission-receiving part 16b of the checking member 16 so that the checking member 16 is rotated in the counterclockwise direction. As a result, the checking part 16a of the checking member 16 is made to separate from the trajectory of the movement of the checked part 8a of the first blade-driving first member 8. And, the pressing part 15b of the cocking member 15 separates from the part 9a of the first blade-driving second member 9, and the other pressing part 15c of the cocking member 15 separates from the roller 13 which is fitted to the second blade-driving second member 12.

When the exposure operations of the first and second blades are complete in shooting and then the focal plane shutter reaches such a state of the focal plane shutter which is shown in FIG. 2, imaging information is immediately transferred from the image sensor to the storage means via an information-processing circuit. And, a control circuit provided for a camera is given a set length of time during which imaging information can be transferred to the storage means, in advance. Accordingly, in the conventional cases, the cocking member starts to perform its cocking operation in its initial position after time during which imaging information can be transferred to the storage means passes by, as shown in FIG. 10 (B). It is because conventional focal plane shutters of this type are formed in such a way that their second blades are made to completely leave the aperture 1a but their first blades are made not to completely cover the opening 1a due to the cocking operation, so that, if the cocking operation is started in the middle of time during which imaging information can be transferred to a storage means, light meets an image sensor during the transfer of the imaging information and smear occurs and disturbs the imaging information.

However, as shown in FIG. 10 A, the focal plane shutter of the present embodiment is formed in such a way that: the second blade remains covering the aperture 1a even though the cocking member 15 starts to perform its cocking operation in the middle of time during which imaging information can be transferred to the storage means, so that light does not meet the imaging sensor; and the second blade is made to open the aperture 1a just before the completion of the cocking operation of the cocking member after time during which the imaging information can be transferred to the storage means passes by, so that the aperture 1a is fully opened. Accordingly, a series of shooting cycles (T) in the present embodiment, which corresponds to the length of time from the time a release button of a camera is pressed in shooting to the time shooting is complete and the focal plane shutter reaches a state of the focal plane shutter being on standby for next shooting, is considerably shorter than a series of shooting cycle (t) in the conventional focal plane shutter, so that next shooting can be early performed in the focal plane shutter of the present embodiment. Next, it is concretely explained below that the focal plane shutter of the present embodiment can favorably operate in such a manner.

When the exposure operation is complete and the focal plane shutter of the present embodiment reaches a state of the focal plane shutter which is shown in FIG. 2, the cocking operation of the focal plane shutter immediately starts in the present embodiment, as described above. And, the cocking operation is performed in such a way that a camera body-side member which is not shown in the drawings pushes the part 15a of the cocking member 15 downward, so that the cocking member 15 is rotated in the counterclockwise direction against the elastic force of the return spring which is not shown in the drawings. And, when the cocking member 15 starts to rotate in such a manner, the transmission-receiving part 16b of the checking member 16 is pushed by the transmission part 15e of the cocking member 15, so that the checking member 16 is rotated in the clockwise direction and the checking part 16a is moved into the trajectory of the movement of the checked part 8a of the first blade-driving first member 8.

When the cocking member 15 and the checking member 16 start to rotate in such a manner, the pushing part 15b of the cocking member 15 first pushes the part 9a of the first blade-driving second member 9 afterward, so that the first blade-driving second member 9 is made to start to rotate in the clockwise direction against the elastic force of the first blade-driving spring which is not shown in the drawings. At this point, force rotating the first blade-driving first member 8 through the first blade in the clockwise direction is applied to the first blade-driving first member 8 by the cocking spring 24. As a result, the part 8b of the first blade-driving first member 8 follows the pushing part 9c of the first blade-driving second member 9, the first blade-driving first member 8 is also rotated in the clockwise direction, and the four blades 20 to 23 for the first blade are made to start to move downward while unfolding.

From then on, as described above, the distance between the checking part 16a of the checking member 16 rotated clockwise by the cocking member 15 and the part 8a of the first blade-driving first member 8 made to start to rotate clockwise gradually becomes short. And, this clockwise rotation of the first blade-driving first member 8 makes the slit-forming blade 23 of the first blade start to cover the aperture 1a, and then an amount of the overlap between the slit-forming blade 23 of the first blade and the slit-forming blade 30 of the second blade stopping at this point reaches to a predetermined amount. At this point, the other pushing part 15c of the cocking member 15 meets the roller 13 which is fitted to the second blade-driving second member 12. And, the checking part 16a of the checking member 16 meets the checked part 8a of the first blade-driving first member 8 at the approximately same time as the pushing part 15c meets the roller 13. Such a state of the focal plane shutter is shown in FIG. 3.

Figure 3:
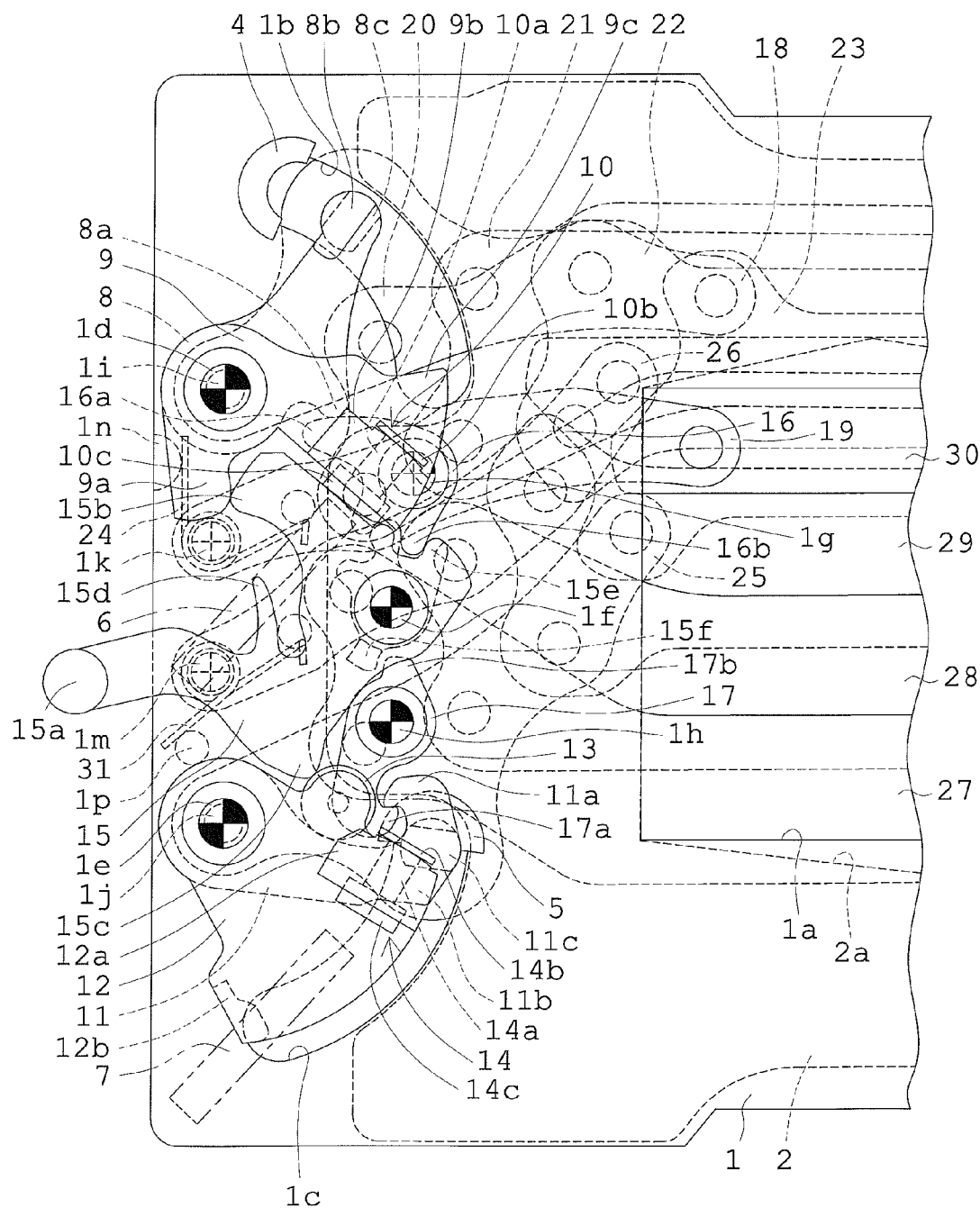
FIG. 3 is a plane view showing a state in which a first blade covers a part of an exposure aperture when a second blade covers the exposure aperture at the initial stage of the cocking operation of the focal plane shutter which starts in the state of the focal plane shutter shown in FIG. 2.

Even after the focal plane shutter reaches to the state which is shown in FIG. 3, the cocking member 15 continues to rotate in the counterclockwise direction, so that the roller 13 is pushed by the pushing part 15c and the second blade-driving second member 12 is rotated in the clockwise direction against the elastic force of the second blade-driving spring which is not shown in the drawings. On the other hand, the engaging part 17a of the locking member 17 engages with the part 11a of the second blade-driving first member 11, so that the second blade-driving first member 11 is locked by the locking member 17. As a result, the second blade-driving first member 11 cannot be rotated in the clockwise direction by the elastic force of the second blade-cocking spring 31 with the part 11b following the pushing part 12b of the second blade-driving second member 12, so that only the second blade-driving second member 12 continues to rotate in the clockwise direction with the four blades 27 to 30 of the second blade remaining covering the aperture 1a.

At the stage where the second blade-driving second member 12 stats to rotate in the clockwise direction in such a manner, the checking part 16a of the checking member 16 comes into contact with the part 8a of the first blade-driving first member 8, as described above. As a result, the after counterclockwise rotation of the cocking member 15 makes the checking part 16a of the checking member 16 push the part 8a, the first blade-driving first member 8 is rotated in the counterclockwise direction against the elastic force of the first blade-cocking spring 24, and the four blades 20 to 23 of the first blade return to the upper area of the aperture 1a. Accordingly, after the focal plane shutter reaches a state which is shown in FIG. 3, the cocking member 15 continues to rotate in the counterclockwise direction against the elastic forces of both the first blade-driving and second blade-driving springs which are not shown in the drawings and against the elastic force of the first blade-cocking spring 24.

And, when the four blades 20 to 23 of the first blade completely leave the aperture 1a upward afterward, the iron parts 10c and 14c of the iron piece members 10 and 14 which are fitted to the first blade-driving and second blade-driving second members 9 and 12 respectively meet the magnetic poles of the iron core members 6 and 7 of the electromagnets for the first and second blades respectively, one after the other. And, the transfer of the imaging information to the storage means has been already complete around this point. Also, when the iron parts 10c and 14c of the iron piece members 10 and 14 meet the magnetic poles of the iron core members 6 and 7 respectively, the pushing part 15f of the cocking member 15 pushes the part 17b of the locking member 17, so that the locking member 17 is rotated in the clockwise direction against the elastic force of the spring which is not shown in the drawings, so that the second blade-driving first member 11 is released from the engagement with the locking member 17.

Figure 4:
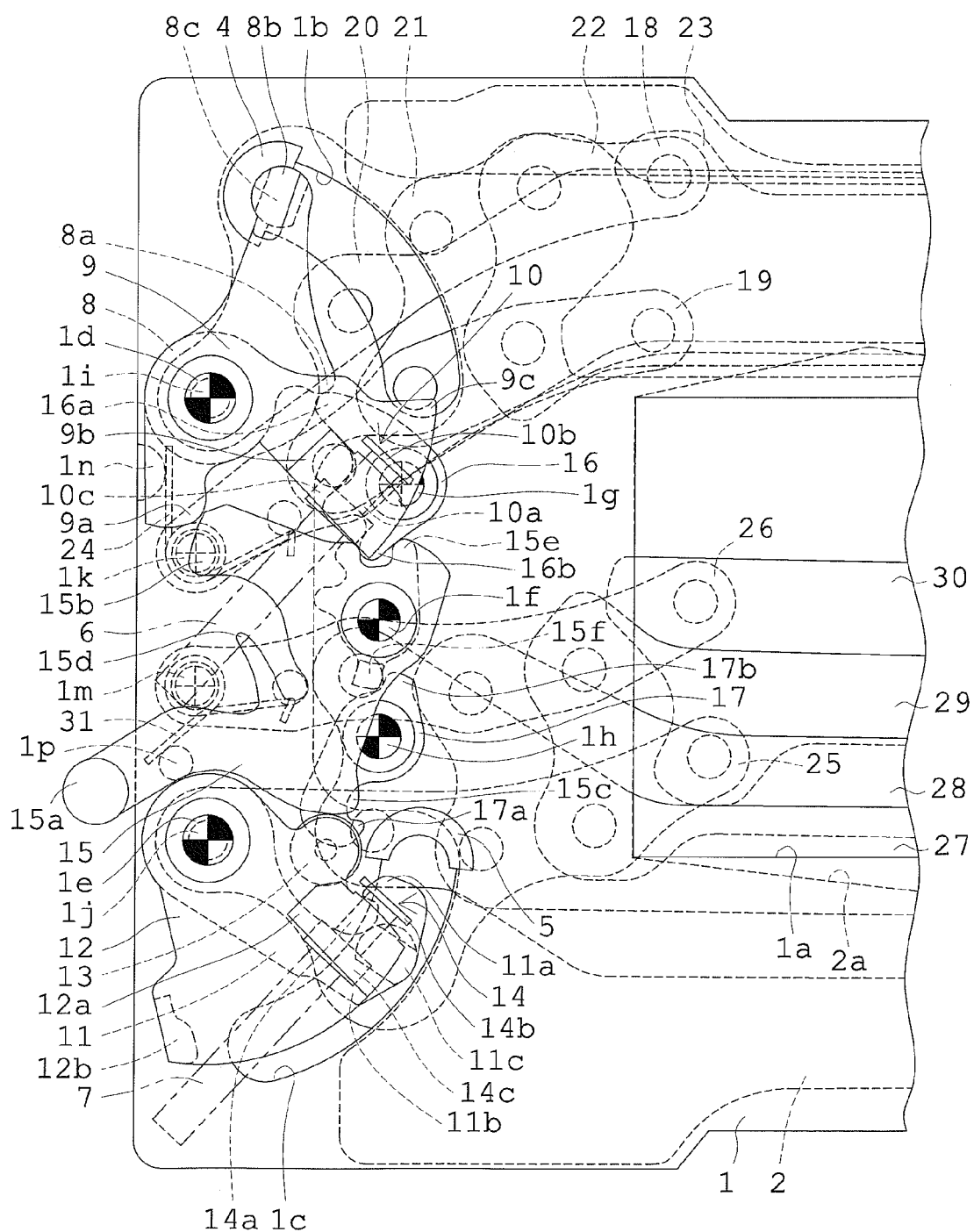
FIG. 4 is a plane view showing a state in which the cocking operation progresses more than in FIG. 3, the first blade leaves the exposure aperture, and the second blade is on the way to beginning to cover the exposure aperture.

The cocking member 15 is stopped after the cocking member 15 is slightly rotated afterward. In that process, the iron parts 10c and 14c of the iron piece members 10 and 14 are pushed into the fitting parts 9b and 12a against the elastic forces of the compression springs which are not shown in the drawings, respectively. As a result, a part of each of the shafts 10a and 14a appears on the opposite side, so that the head parts 10b and 14b separate from the fitting parts 9b and 12a, respectively. Also, when the second blade-driving first member 11 is released from the engagement with the locking member 17, the second blade-driving first member 11 is rotated in the clockwise direction by the elastic force of the second blade-cocking spring 31. As a result, the four blades 27 to 30 of the second blade move downward while amounts of the overlaps between adjacent blades of the four blades 27 to 30 are increasing, so that the aperture 1a is opened. FIG. 4 shows a process in which the four blades 27 to 30 of the second blade open the aperture 1a in such a manner.

Figure 5:
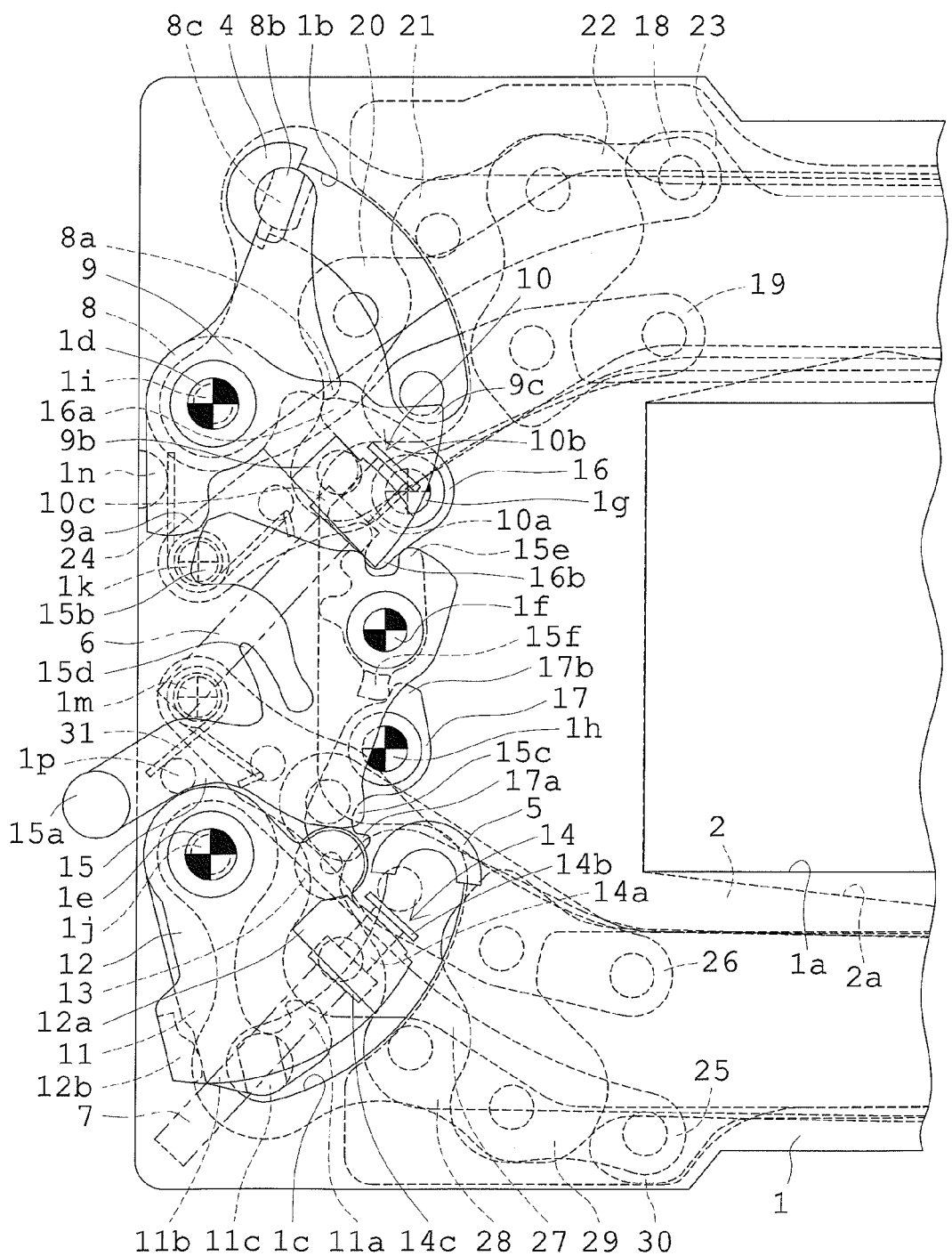
FIG. 5 is a plane view showing a state in which the cocking operation is complete and the exposure aperture is fully opened.

When the cocking member 15 is stopped in its initial position in such a manner, the part 11c of the second blade-driving first member 11 meets the pressing part 12b of the second blade-driving second member 12, so that the second blade-driving first member 11 also is stopped and the aperture 1a is fully opened. That state is shown in FIG. 5 and is a state in which the cocking operation of the focal plane shutter is complete, or in which the focal plane shutter is on standby for next shooting. In the state of the focal plane shutter which is shown in FIG. 5, the camera body-side member makes the cocking member 15 maintain this state shown in FIG. 5 against the elastic force of the return spring until next shooting, the return spring not being shown in the drawings. Accordingly, because the aperture 1a is fully opened in this state shown in FIG. 5, the image of an object can be observed through an electronic view finder if the power supply of a camera is not cut.

Besides, in the present embodiment, the pressing part 15f of the cocking member 15 presses the part 17b of the locking member 17, with the result that the second blade-driving first member 11 is released from the engagement with the locking member 17. However, the present invention is not limited to such a constitution. For, example, focal plane shutters according to the present invention may be made to have a constitution in which: the part 17b of the locking member 17 is formed on the top end of a potion of the locking member 17 running toward the opening-1a side; and that part is pressed by the camera body-side member so that the second blade-driving first member 11 is released from the engagement with the locking member 17.

Also, the focal plane shutter of the present embodiment is formed as a direct-type focal plane shutter. However, also in the case where the focal plane shutter of the present embodiment is formed as a locking-type focal plane shutter, there is necessity that the cocking member 15 is made not to return to its initial position immediately after the completion of the cocking operation of the focal plane shutter but made to remain in its cocked position as in the present embodiment. As can be seen from the below explanation, it is because the four blades 20 to 23 for the first blade start to move and then inevitably cover the opening 1a if the cocking member 15 returns to its initial position, so that the image of an object cannot be observed through an electronic view finder in advance of next shooting.

Next, the case where next shooting is performed in such a cocked state of the focal plane shutter is explained. When a release button of a camera is pressed in the state of the focal plane shutter shown in FIG. 5 while the image of an object is being observed through an electronic view finder, the electromagnets for the first and second blades are magnetized ("ON" in FIG. 10) before the start of actual shooting (exposure operation), so that the iron piece members 10 and 14 are attracted by the iron core members 6 and 7, respectively. Next, the cocking member 15 is released from the press of the part 15a due to the camera body-side member which is not shown in the drawings, so that the cocking member 15 is rotated in the clockwise direction by the elastic force of the return spring which is not shown in the drawings, and the cocking member 15 is made to return to its initial position.

At the initial stage of the operation of the cocking operation 15 returning to its initial position, the pressing part 15b of the cocking member 15 separates from the part 9a of the first blade-driving second member 9 and the pressing part 15c of the cocking member 15 separates from the roller 13 which is fitted to the second blade-driving second member 12, so that the first blade-driving and second blade-driving second members 9 and 12 are rotated in the counterclockwise direction by the elastic forces of the first blade-driving and second blade-driving springs which are not shown in the drawings, respectively. And, when the first blade-driving and second blade-driving second members 9 and 12 are rotated slightly, their fitting parts 9b and 12a meet the head parts 10b and 14b of the iron piece members 10 and 14 respectively, so that the first blade-driving and second blade-driving second members 9 and 12 are stopped.

Such a slight rotation of the second blade-driving second member 12 makes the pressing part 12b of the second blade-driving second member 12 press the part 11b of the second blade-driving first member 11, so that the second blade-driving first member 11 is also rotated slightly against the elastic force of the second blade-cocking spring 31 and the four blades 27 to 30 for the second blade also move slightly upward but are stopped before the four blades 27 to 30 start to cover the opening 1a. The positions which the first blade-driving second member 9, the second blade-driving first member 11, the second blade, and the second blade-driving second member 12 attain in such a manner respectively correspond to exposure operation-starting positions for them, respectively.

Figure 6:
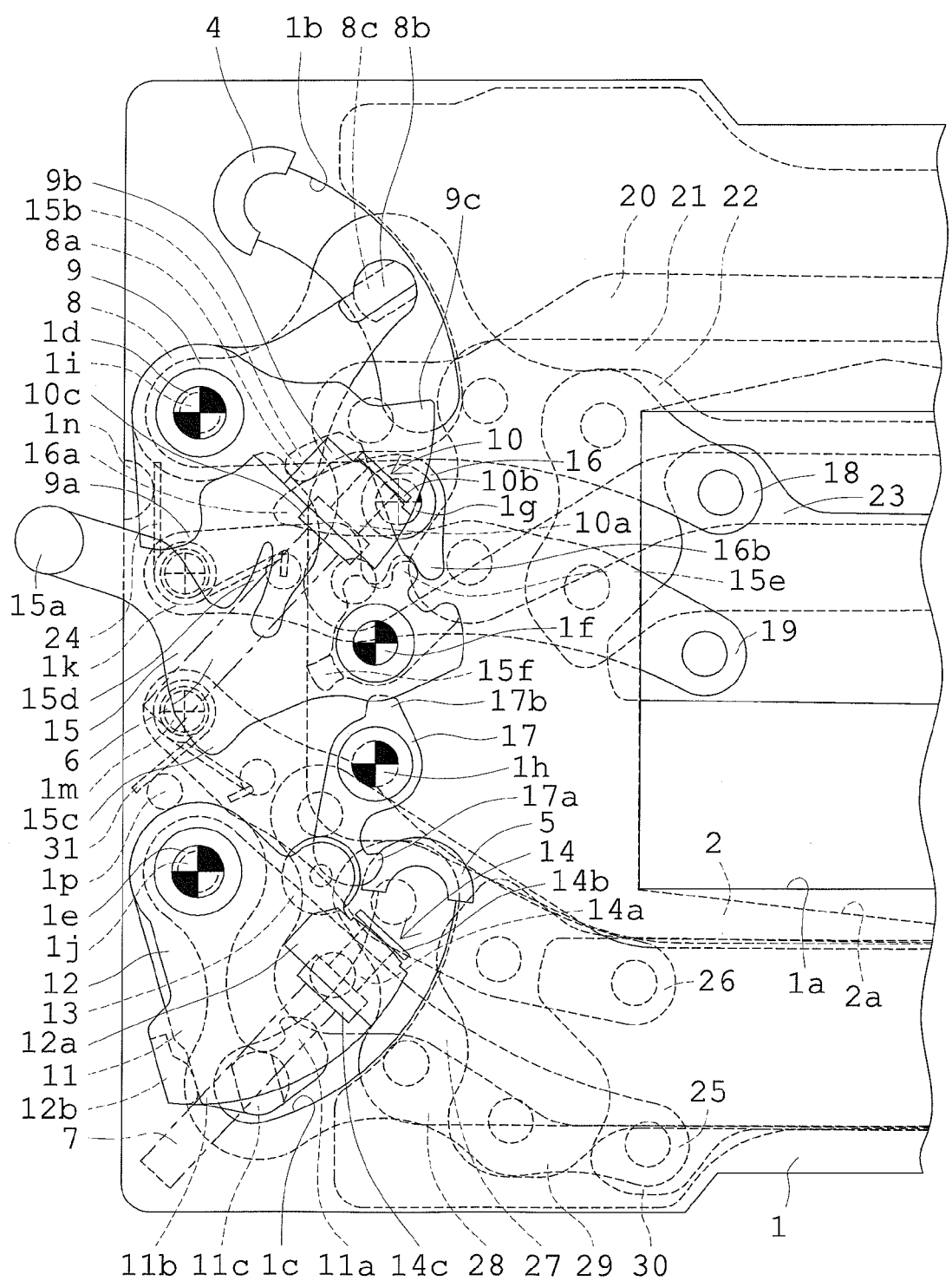
FIG. 6 is a plane view showing a state in which a cocking member is on the way to returning from its cocked position to its initial position prior to the exposure operation by pressing a release button of a camera.

Also, when the cocking member 15 returns from its cocked position to its initial position, the checking member 16 is also rotated in the counterclockwise direction. As a result, the checked part 8a of the first blade-driving first member 8 is released from the press of the checked part 8a due to the checking part 16a, so that the first blade-driving first member 8 is rotated in the clockwise direction by the elastic force of the first blade-cocking spring 24 while its checked part 8a is following the checking part 16a of the checking member 16. As a result, the four blades 20 to 23 for the first blade cover the opening 1a while amounts of the overlaps between adjacent blades of the four blades 20 to 23 are decreasing. FIG. 6 shows the state of the focal plan shutter in which the four blades 20 to 23 for the first blade cover half or more of the opening 1a in such a manner.

When the cocking member 15 rotates in the clockwise direction more from the position of the cocking member 15 shown in FIG. 6 and the four blades 20 to 23 for the first blade completely cover the opening 1a, the checking part 16a of the checking member 16 leaves the trajectory of the movement of the checked part 8a of the first blade-driving first member 8. As a result, the first blade-driving first member 8 is released from the situation where the checked part 8a follows the checking part 16a, so that the first blade-driving first member 8 rotates faster than the first blade-driving first member 8 does with the checked part 8a following the checking part 16a. And, the part 8b meets the pressing part 9c of the first blade-driving second member 9, so that the first blade-driving first member 8 is stopped.

Figure 7:
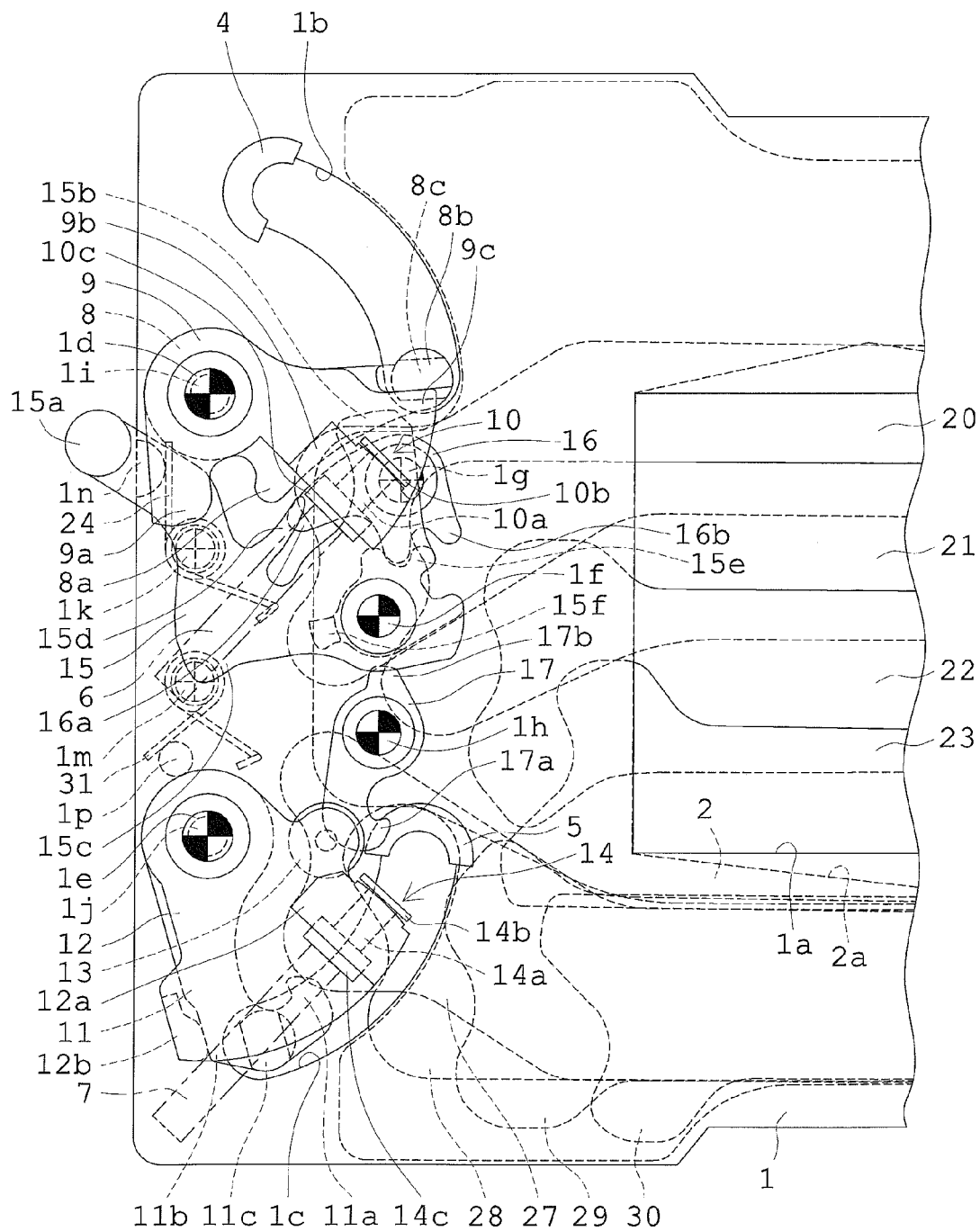
FIG. 7 is a plane view showing a state in which the cocking member returns to its initial position and which is a state of the focal plane shutter just before the exposure operation starts.

As described above, because the first blade-driving first member 8 is released from the situation where the checked part 8a follows the checking part 16a, in the latter half of the rotation, the part 8b hardly bounces when the part 8b meets the pressing part 9c of the first blade-driving second member 9 and the first blade can be stopped early. FIG. 7 shows a state of the focal plane shutter in which the cocking member 15 is stopped in its initial position at the approximately same time as the first blade is stopped in such a manner. The positions of the first blade-driving first member 16 and the first blade which are shown in FIG. 7 correspond to exposure operation-starting positions for them, respectively.

When the cocking member 15 returns to its initial position in such a manner, the electromagnets for the first and second blades are demagnetized ("OFF" in FIG. 10) in turn at a predetermined time interval corresponding to the brightness of an object. So, when the electromagnet for the first blade is first demagnetized, the attraction of the iron core member 6 to the iron piece member 10 disappears, so that the first blade-driving second member 9 is rapidly rotated in the counterclockwise direction by the elastic force of the first blade-driving spring which is not shown in the drawings. At this point, the pressing part 9c presses the part 8b of the first blade-driving first member 8, so that the first blade-driving second member 9 rotates the first blade-driving first member 8 in the counterclockwise direction against the elastic force of the first blade-cocking spring 24. As a result, the four blades 20 to 23 for the first blade move upward while amounts of the overlaps between adjacent blades of the four blades 20 to 23 are increasing, so that the opening 1a is opened through the lower edge of the slit-forming blade 23.

Figure 8:
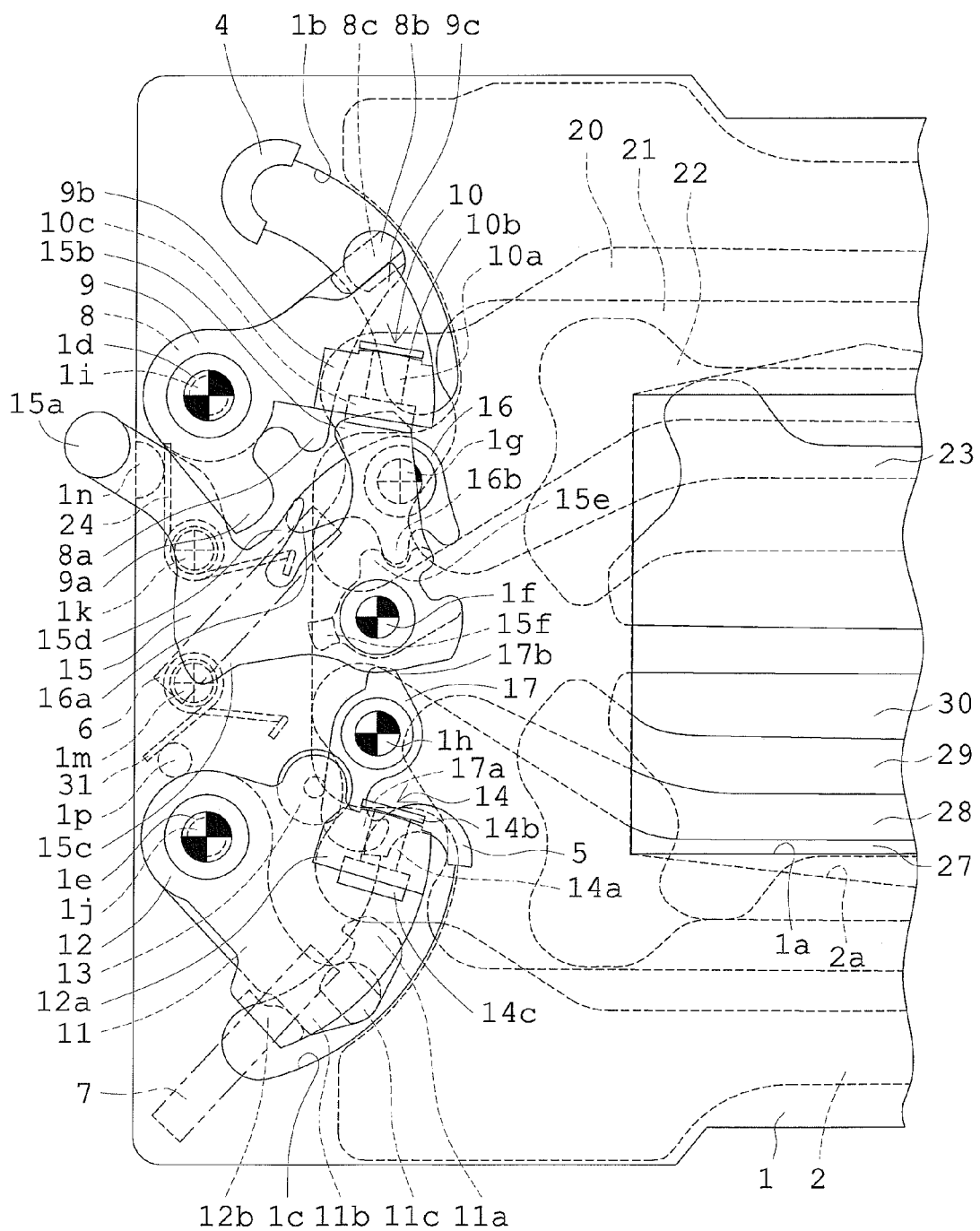
FIG. 8 is a plane view showing a state in which the first and second blades are in the middle of their respective exposure operations.

When the electromagnet for the second blade is demagnetized after the predetermined time passes by since the electromagnet for the first blade was demagnetized, the attraction of the iron core member 7 to the iron piece member 14 disappears, so that the second blade-driving second member 12 is rapidly rotated in the counterclockwise direction by the elastic force of the second blade-driving spring which is not shown in the drawings. At this point, the pressing part 12b presses the part 11b of the second blade-driving first member 11, so that the second blade-driving second member 12 rotates the second blade-driving first member 11 in the counterclockwise direction against the elastic force of the second blade-cocking spring 31. As a result, the four blades 27 to 31 for the second blade move upward while amounts of the overlaps between adjacent blades of the four blades 27 to 30 are decreasing, so that the opening 1a is closed through the upper edge of the slit-forming blade 30. As a result, afterward, the image plane of an image sensor is exposed from the lower side of the image plane to the upper side of the image plane continuously by a slit which is formed between the slit-forming blades 24 and 31 of the first and second blades. FIG. 8 shows the state of the focal plane shutter in which the focal plane shutter is in the middle of such an exposure operation.

Figure 9:
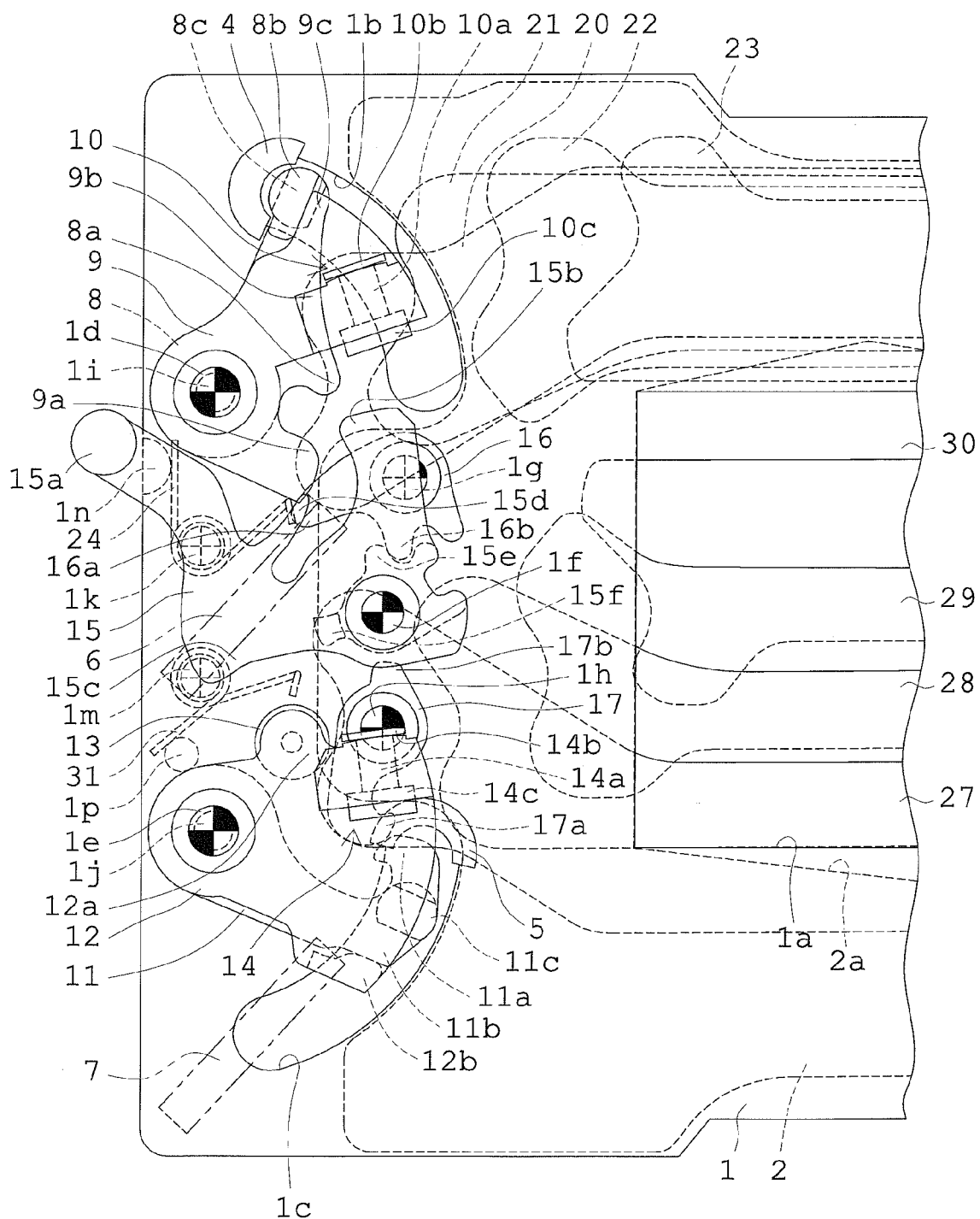
FIG. 9 is a plane view showing a state of the focal plane shutter just before the exposure operations of the first and second blades are complete.

At the final stage of the exposure operation performed in such a manner, the part 9a of the first blade-driving second member 9 first meets the brake part 15d of the cocking member 15, so that the first blade-driving second member 9 is braked while the first blade-driving second member 9 is bending the brake part 15d. And then, the part 11a of the second blade-driving first member 11 meets the engagement part 17a of the locking member 17, so that the second blade-driving first member 11 is braked while rotating the locking member 17 in the clockwise direction against the elastic force of the spring which is not shown in the drawings. FIG. 9 shows the state of the focal plane shutter in which: the first blade-driving second member 9 is in the final stage of such a rotation of the first blade-driving second member 9 braked by the brake part 15d; and the part 11a is made to meet the engagement part 17a of the locking member 17 so that the second blade-driving first member 11 is braked in such a manner.

And, the part 9a of the first blade-driving second member 9 moves away from the brake part 15d of the cocking member 15 just after a state of the focal plane shutter which is shown in FIG. 9, and the driving pin 8c of the first blade-driving first member 8 meets the buffer member 4 afterward, so that the two first blade-driving members 8 and 9 and the first blade are stopped. Next, when the part 11a of the second blade-driving first member 11 that is braked by the engagement part 17a up to now moves away from the brake part 17a of the locking member 17 and the locking member 17 reaches a state in which the locking member 17 can rotate in the counterclockwise direction by the elastic force of the spring which is not shown in the drawings, the driving pin 11c of the second blade-driving first member 11 meets the buffer member 5, so that the two second blade-driving members 11 and 12 and the second blade are stopped.

Now, the primary role of the locking member 17 in the present embodiment is to lock the second blade-driving first member 11 so that the four blades 27 to 30 for the second blade cover the opening 1a from the time the cocking operation of the focal plane shutter starts to the time the transfer of imaging information from an image sensor is complete. Accordingly, a locking member for the present invention is not necessarily formed in the manner according to the present embodiment and may be formed in such a way that: the locking member does not come into contact with the second blade-driving first member 11 before the second blade-driving first member 11 completely stops in the above-described manner; and, for example, the second blade-driving first member 11 engages with and is locked by a camera body-side member as the locking member after the second blade-driving first member 11 completely stops, so as to prevent the second blade-driving first member 11 from rotating in the clockwise direction. However, in the present embodiment, the locking member 17 is formed in the above-described manner in order not to provide the focal plane shutter of the present embodiment with a special braking member, and the locking member 17 also plays a role as a member braking the rotations of the two second blade-driving members 11 and 12 at the final stage of the exposure operation.

Also, when the exposure operation is complete, the driving pin 11c meets the buffer member 5, so that the second blade-driving first member 11 might inevitably bounce. As a result, the upper edge of the slit-forming blade 30 for the second blade moves onto the opening 1a temporarily, so that there is fear that the image sensor might be exposed again. In such a case, conventional focal plane shutters are provided with a member which prevents the bounce of such a blade-driving member, solely. Alternatively, the member which prevents the bounce of such a blade-driving member is used also as a braking member in conventional focal plane shutters. However, in the present embodiment, even though the second blade-driving first member 11 bounces, the engagement part 17a of the locking member 17 engages with the part 11a of the second blade-driving first member 11. Accordingly, there is no necessity that the focal plane shutter of the present embodiment is specially provided with a member for preventing the bounce of the second blade-driving first member 11.

A state of the focal plane shutter of the present embodiment in which the two second blade-driving members 11 and 12 and the second blade are stopped in the above-described manner is a state of the focal plane shutter just after the completion of the exposure operation, this state of the focal plane shutter being shown in FIGS. 1 and 2. Afterward, when imaging information is transferred from the image sensor to the storage means via the imaging information-processing circuit, the shooting is complete. In the present embodiment, the cocking operation is performed during the transfer of the imaging information, as explained already. As a result, the length of time from the time first shooting is performed to the time next shooting is performed becomes short in the present embodiment, and the focal plane shutter of the present embodiment is particularly advantageous for digital cameras with which continuous shooting can be performed.

Besides, as described above, the cocking operation of the focal plane shutter of the present embodiment is performed in such a way that the part 15a is pressed directly by the camera body-side member so that the cocking member 15 is rotated against the elastic force of the return spring which is not shown in the drawings. However, focal plane shutters according to the present invention are not limited to such a constitution. Focal plane shutters according to the present invention may be formed in such a way that: another cocking member which is different from the cocking member 15 and is operated by the camera body-side member is fitted to the shutter base plate 1; and the cocking member 15 is rotated through the another cocking member, as known publically. In this case, the return spring for returning the cocking member 15 to its initial position may be connected to the cocking member 15 as in the present embodiment or may be connected to such another cocking member.

Now, as explained already, focal plane shutters according to the present invention can be embodied as locking-type focal plane shutters. However, the above-described focal plane shutter of the present embodiment is formed as a direct-type focal plane shutter. And, in the explanation of the present embodiment, it is explained that, when the focal plane shutter is formed as a locking-type focal plane shutter, a focal plane shutter according to the present invention should be formed in such a way that a cocking member is not immediately returned to its initial position after the completion of the cocking operation but is returned to its initial position before exposure operation is started in the initial stage of shooting, like the cocking member for the present embodiment. Accordingly, it is considered that it is possible to sufficiently understand that focal plane shutters according to the present invention can be embodied as a locking-type focal plane shutter, only with the explanation of the present embodiment. However, just to make sure, a constitution for forming the focal plane shutter of the present embodiment as a locking type focal plane shutter is explained shortly.

First, the iron piece members 10 and 14 are not fitted to the first blade-driving and second blade-driving second members 9 and 12 respectively, unlike the present embodiment. Instead, each of the first blade-driving and second blade-driving second members 9 and 12 is provided with a part to be locked. And, these first blade-driving and second blade-driving second members 9 and 12 are formed in such a way that the first blade-driving and second blade-driving second members 9 and 12 are rotated more beyond their positions in which their parts to be locked engage with and are locked by the locking members respectively, in a state of the focal plane shutter in which the cocking operation of the focal plane shutter is complete and which is shown in FIG. 5. And, as in the present embodiment, the first blade-driving and second blade-driving second members 9 and 12 are formed in such a way that the parts to be locked of these blade-driving second members 9 and 12 engage with and locked by the locking members respectively at the initial stage of the process of returning the cocking member 15 to its initial position by pressing a release button of a camera. And, afterward, the focal plane shutter formed as a locking type one is operated in the quite same manner as the focal plane shutter of the present embodiment is, until the cocking member 15 returns to its initial position.

On the other hand, two engagement-releasing members, which are provided for the focal plane shutter in order to release the engagements of the respective parts to be locked with the respective locking members, are attracted and held by the electromagnets for the first and second blades against the elastic forces of the respective springs before the cocking member 15 starts to return to its initial position in the above-described manner. And, when the cocking member 15 operates in the above-described manner afterward and returns to its initial position shown in FIG. 7, the supply of electric current to the electromagnet for the first blade and the supply of electric current to the electromagnet for the second blade are cut off in turn. As a result, the engagement-releasing members are made to operate by the elastic forces of the respective springs respectively, so that the engagement-releasing members release these blade-driving members 9 and 12 from the engagements of the parts to be locked with the locking members respectively. As a result, the first blade-driving second member 9 and the second blade-driving second member 12 start to perform their exposure operations in turn. And, in the cocking operation of the focal plane shutter, the two engagement-releasing members are made to come into contact with the electromagnets respectively in response to the movement of the cocking member 15. Besides, various kinds of constitutions for achieving such an operation of the focal plane shutter formed as a locking-type one are known publically, and one example of such constitutions is also disclosed in Japanese Patent TOKUKAI No. 2001-215555.

What is claimed is:

1. A focal plane shutter for cameras provided with a first blade driving means which makes a first blade leave an exposure aperture by putting a cocking member in its cocked position in the cocked state of the focal plane shutter, as well as in a state of the focal plane shutter in the completion of the exposure operation, and which makes the first blade cover the exposure aperture in the return operation of the cocking member, a second blade-driving first member which engages with and is locked by a locking member in the cocking operation of the cocking member so as to keep a second blade covering the exposure aperture and which makes the second blade leave the exposure aperture when the second blade-driving first member is released from the engagement with the locking member just before the cocking member reaches its cocked position, and a second blade-driving second member which is rotated by the cocking operation of the cocking member in a rotation direction bringing the second blade-driving second member to its cocked state and which rotates the second blade-driving first member in the exposure operation in a rotation direction in which the exposure operation of the second blade-driving first member is performed, so as to make the second blade cover the exposure aperture.

2. A focal plane shutter for cameras according to claim 1, wherein the first blade-driving means comprises a first blade-driving first member biased by a first blade-driving spring in a rotation direction in which the exposure operation of the first blade-driving first member is performed, and a first blade-driving second member connected to the first blade and biased by a cocking spring in the rotation direction opposite to the rotation direction in which the exposure operation of the first blade-driving second member is performed.

3. A focal plane shutter for cameras according to claim 1, wherein the cocking member has a pushing part, the locking member has a part to be pushed, and the pushing part of the cocking member pushes the part to be pushed of the locking member just before the completion of the cocking operation of the cocking member so that the second blade-driving first member is released from the engagement with the locking member.

4. A focal plane shutter for cameras according to claim 3, wherein the locking member is given force rotating the locking member in one direction by a spring in order to engage with and lock the second blade-driving first member, and the second blade-driving first member meets the locking member just before the completion of the exposure operation and the locking member is rotated against the elastic force of the spring, with the result that the locking member also plays a role as a brake member for braking the rotation of the second blade-driving first member.

5. A focal plane shutter for cameras according to claim 3, wherein the locking member also plays a role as a member for locking bouncing of the second blade-driving first member when the second blade-driving first member meets a stopper in the completion of the exposure operation.

6. A digital camera provided with a focal plane shutter according to claim 3.

7. A focal plane shutter for cameras according to claim 1, wherein the locking member is given force rotating the locking member in one direction by a spring in order to engage with and lock the second blade-driving first member, and the second blade-driving first member meets the locking member just before the completion of the exposure operation and the locking member is rotated against the elastic force of the spring, with the result that the locking member also plays a role as a brake member for braking the rotation of the second blade-driving first member.

8. A focal plane shutter for cameras according to claim 7, wherein the locking member also plays a role as a member for locking bouncing of the second blade-driving first member when the second blade-driving first member meets a stopper in the completion of the exposure operation.

9. A digital camera provided with a focal plane shutter according to claim 7.

10. A focal plane shutter for cameras according to claim 1, wherein the locking member also plays a role as a member for locking bouncing of the second blade-driving first member when the second blade-driving first member meets a stopper in the completion of the exposure operation.

11. A digital camera provided with a focal plane shutter according to claim 10.

12. A digital camera provided with a focal plane shutter according to claim 1.

* * * * *